US011805415B2

(12) United States Patent
Ran et al.

(10) Patent No.: US 11,805,415 B2
(45) Date of Patent: Oct. 31, 2023

(54) AUTHENTICATION ENHANCEMENT WITH NEIGHBOR DEVICE

(71) Applicant: Hewlett Packard Enterprise Development LP, Houston, TX (US)

(72) Inventors: Guangzhi Ran, Beijing (CN); Qiang Zhou, Sunnyvale, CA (US); Jianpo Han, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 100 days.

(21) Appl. No.: 17/083,420

(22) Filed: Oct. 29, 2020

(65) Prior Publication Data

US 2022/0141660 A1   May 5, 2022

(51) Int. Cl.
*H04W 12/069*   (2021.01)
*H04W 12/041*   (2021.01)
*H04W 12/082*   (2021.01)

(52) U.S. Cl.
CPC ....... *H04W 12/069* (2021.01); *H04W 12/041* (2021.01); *H04W 12/082* (2021.01)

(58) Field of Classification Search
CPC ............. H04W 12/069; H04W 12/082; H04W 12/041; H04L 63/083
See application file for complete search history.

(56) References Cited

U.S. PATENT DOCUMENTS

| 2006/0013398 | A1* | 1/2006 | Halasz | H04W 12/062 380/273 |
| 2006/0039339 | A1* | 2/2006 | Cohen | H04W 12/02 455/433 |
| 2006/0256763 | A1* | 11/2006 | Nguyen | H04W 12/0431 370/338 |
| 2012/0077431 | A1* | 3/2012 | Fyke | H04W 4/80 455/41.1 |
| 2014/0293780 | A1* | 10/2014 | Faccin | H04W 28/02 370/230 |
| 2018/0278625 | A1* | 9/2018 | Cammarota | H04L 9/3268 |
| 2021/0251019 | A1* | 8/2021 | Sayed | H04L 41/0806 |

* cited by examiner

*Primary Examiner* — Mohammad W Reza
(74) *Attorney, Agent, or Firm* — Hewlett Packard Enterprise Patent Department

(57) ABSTRACT

In embodiments of the present disclosure, there is provided a method for authenticating an access point. In the method, a request for joining a network is received from an access point. A neighbor authentication notification is transmitted to the access point for obtaining an authentication code from a neighbor access point that is connected in the network in accordance with a determination that the access point is verified. The authentication code that is generated by the neighbor access point is received from the access point. The access point is accepted to join the network in accordance with a determination that the authentication code is valid. Embodiments of the present disclosure present a safe and effective way for authenticating the access point that is requesting to join the network, which provides enhanced authentication and increases the security level of the network.

17 Claims, 8 Drawing Sheets

AUTHENTICATION ENHANCEMENT WITH NEIGHBOR DEVICE

BACKGROUND

An access point (AP) is a networking device that allows terminal devices to connect to a network. The AP may request to join the network via a wired or wireless mode, and become a node in the network. A controller of the network may implement an authentication procedure to accept or reject the AP. Once the AP is accepted, it can join the network and then be connected by other terminal devices, such as a notebook or a cellphone and the like, for accessing resources in the network. The security level of the authentication procedure greatly influences operations of the network.

SUMMARY

According to a first aspect of the present disclosure, there is provided a method for authenticating an AP. In the method, a request for joining a network is received from an AP. A neighbor authentication notification is transmitted to the AP for obtaining an authentication code from a neighbor AP that is connected in the network in accordance with a determination that the AP is verified. The authentication code that is generated by the neighbor AP is received from the AP. The AP is accepted to join the network in accordance with a determination that the authentication code is valid.

According to a second aspect of the present disclosure, there is provided a method for authenticating an AP. In the method, a neighbor authentication command is received from a controller in a network for generating an authentication code for a target AP, here the target AP is verified by the controller to join the network. A request is received from an AP for obtaining an authentication code. The authentication code is generated based on the neighbor authentication command in accordance with a determination that the AP matches the target AP. The authentication code is transmitted to the AP.

According to a third aspect of the present disclosure, there is provided an authentication device in a network. The authentication device comprises: a processor; and a memory coupled to the processor, the memory storing instructions to cause the processor to implement acts comprising: receiving, from an AP, a request for joining the network; in accordance with a determination that the AP is verified, transmitting to the AP a neighbor authentication notification for obtaining at least one authentication code from at least one neighbor AP that is connected in the network; receiving, from the AP, the at least one authentication code that is generated by the at least one neighbor AP; and in accordance with a determination that any of the at least one authentication code is invalid, rejecting the AP to join the network.

The above aspects of the present disclosure provide enhanced neighbor authentication procedures in the network for authenticating the AP that is requesting to join the network. Therefore, the network may be managed in a safe and reliable way, and thus the security level of the network may be improved.

BRIEF DESCRIPTION OF THE DRAWINGS

Embodiments of the present disclosure may be understood from the following Detailed Description when read with the accompanying Figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

In a network infrastructure, there may be multiple APs such as a router, a switch, a Wi-Fi hotspot device and the like. Here, the Wi-Fi hotspot device may provide a Wi-Fi hotspot for terminal devices such as a notebook, a cellphone and the like. After connected to the AP, the terminal devices may access resources in the network via the AP. Due to an area limitation of the AP, more APs may be added into the network to cover more area and provide more bandwidth to the terminal devices.

Figure 1:
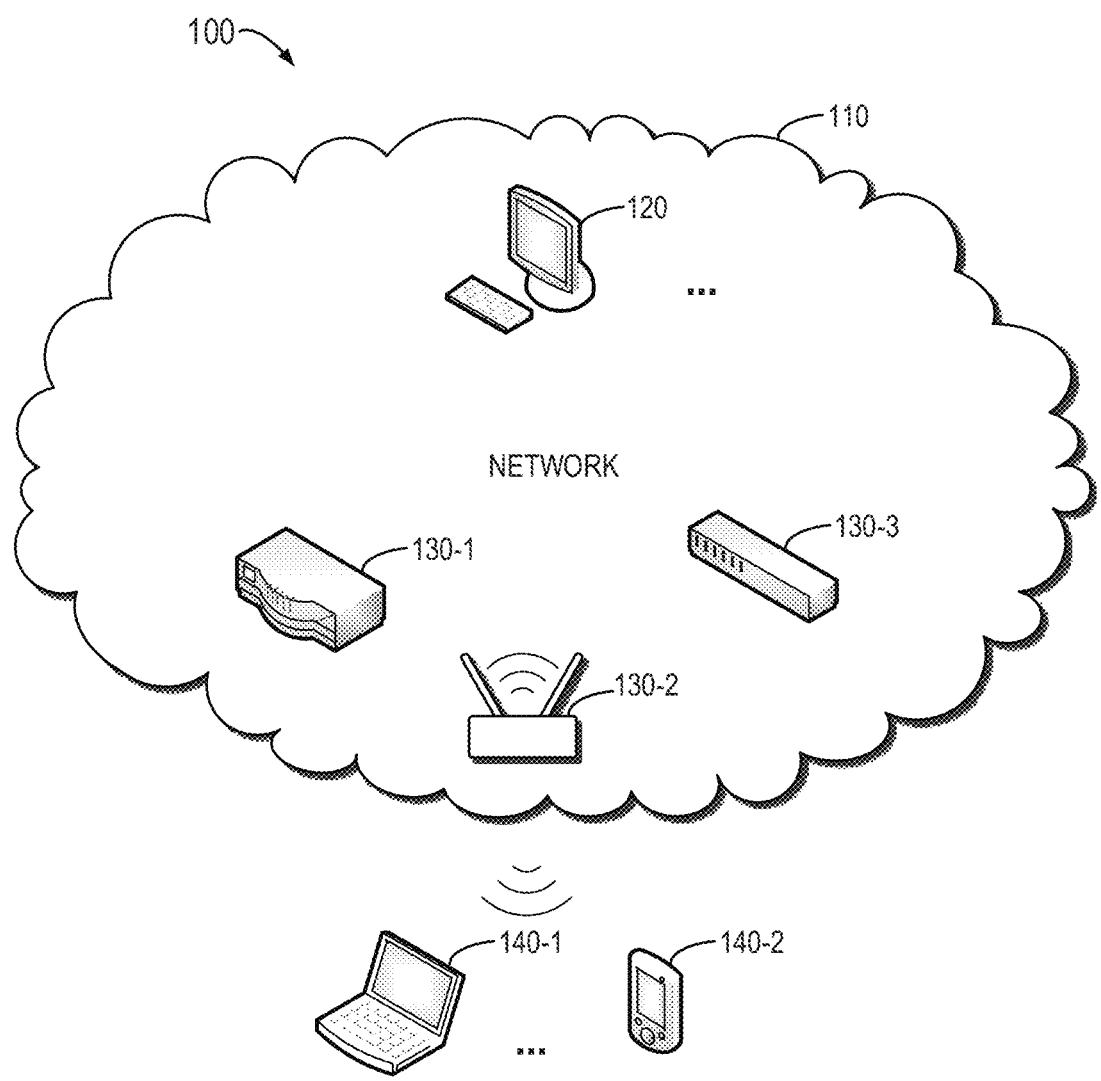
FIG. 1 illustrates an example environment in which embodiments of the present disclosure may be implemented.

Reference will be made to FIG. 1 for a working environment of the network. FIG. 1 illustrates an example environment 100 in which embodiments of the present disclosure may be implemented. In FIG. 1, a network 110 may include multiple devices: a controller 120 for controlling operations of the network 110 and multiple APs for providing access services in the network 110. For example, the AP may include an AP130-1 with a router type, an AP 130-2 with a Wi-Fi hotspot type, and an AP 130-3 with a switch type. Further, terminal devices such as a notebook 140-1, . . . , and a cellphone 140-2 may connect to the AP 130-2 for accessing resources in the network 110.

In order to improve performance of the network 110, more APs may be added into the network 110. Usually, if an AP (such as a Wi-Fi hotspot device) requests to join the network 110, the AP should be authenticated by the controller 120 of the network 110 first. According to one authentication solution, a certification may be stored in the AP, and the controller 120 may authenticate the AP based on the certification. If the certification is a valid one, the AP may be accepted to join the network; otherwise the AP may be rejected. Here, the controller 120 works as the only authentication device for accepting/rejecting the AP. However, the AP itself or the certification in the AP may be attacked, for example, the certification in the AP may be stolen. Then, a malicious AP may pretend as a normal AP and join the network 110 with the stolen certification, and thus the network 110 may become weak and vulnerable. Therefore, how to provide an enhanced authentication procedure becomes a focus.

Figure 2:
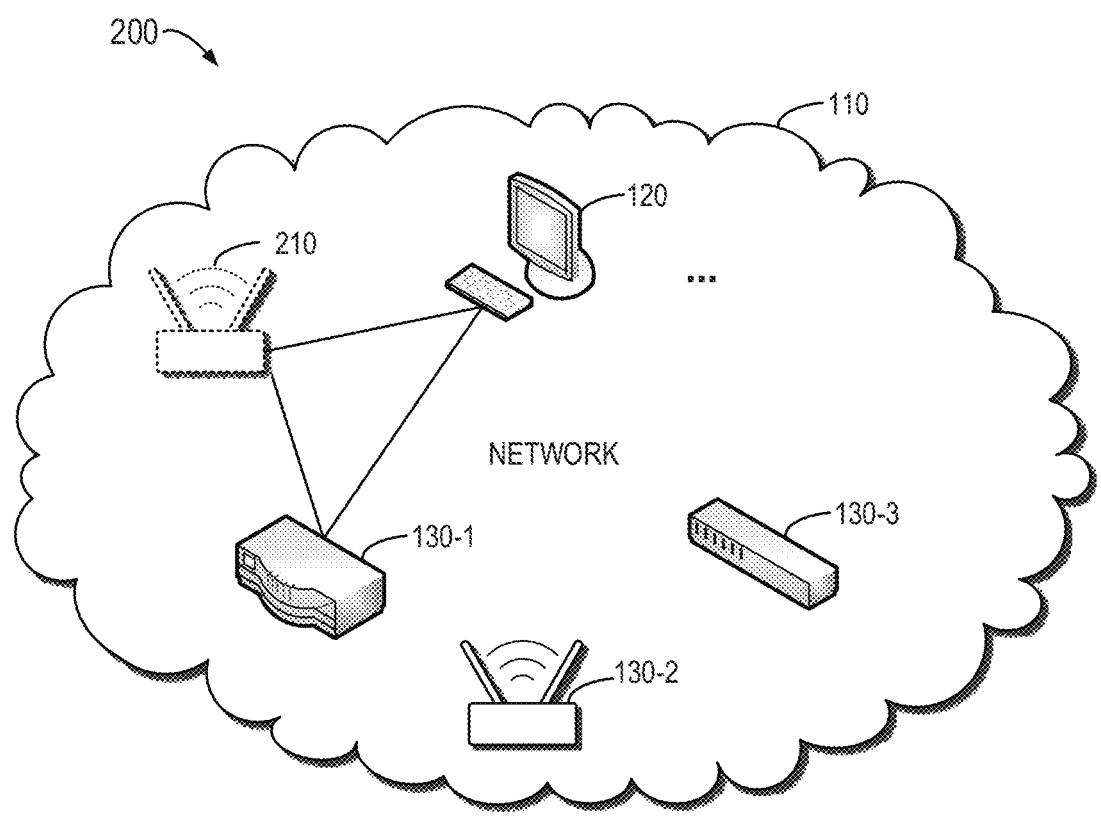
FIG. 2 illustrates a block diagram of an example procedure for authenticating an AP to join a network based on a neighbor AP in the network according to embodiments of the present disclosure.

In view of the above drawbacks, embodiments of the present disclosure provide a more effective way for authenticating an AP to join the network. Specifically, after a normal authentication procedure by the controller 120, the AP is subjected to a neighbor authentication procedure by a neighbor AP that is connected in the network. Reference will be made to FIG. 2 for a brief description of the neighbor authentication procedure. FIG. 2 illustrates a block diagram of an example procedure 200 for authenticating an AP to join a network based on a neighbor AP in the network according to embodiments of the present disclosure.

As illustrated in FIG. 2, an AP 210 may request to join the network 110. If a certification in the AP 210 is verified by the controller 120, the controller 120 may trigger the neighbor authentication procedure by a neighbor AP (such as the AP 130-1). The controller 120 may send a neighbor authentication command to the neighbor AP 130-1 for generating an authentication code. Further, the controller 120 may instruct the AP 210 to obtain the authentication code generated by the neighbor AP and to send the obtained authentication code to the controller 120. If the authentication code is determined as valid by the controller 120, the AP 210 is allowed to join the network 110; otherwise the AP 210 is rejected.

With the above embodiment, after the normal authentication procedure by the controller 210, the neighbor AP 130-1 may provide a second authentication procedure to the AP 210. Therefore, the security level of the network 110 may be increased effectively. Although FIG. 2 illustrates that the AP 130-1 is selected as the neighbor AP, in other embodiments, another AP may be selected from the APs 130-1, . . . , and 130-3. Alternatively, more than one neighbor AP may be selected for provide multiple neighbor authentication procedures.

Figure 3:
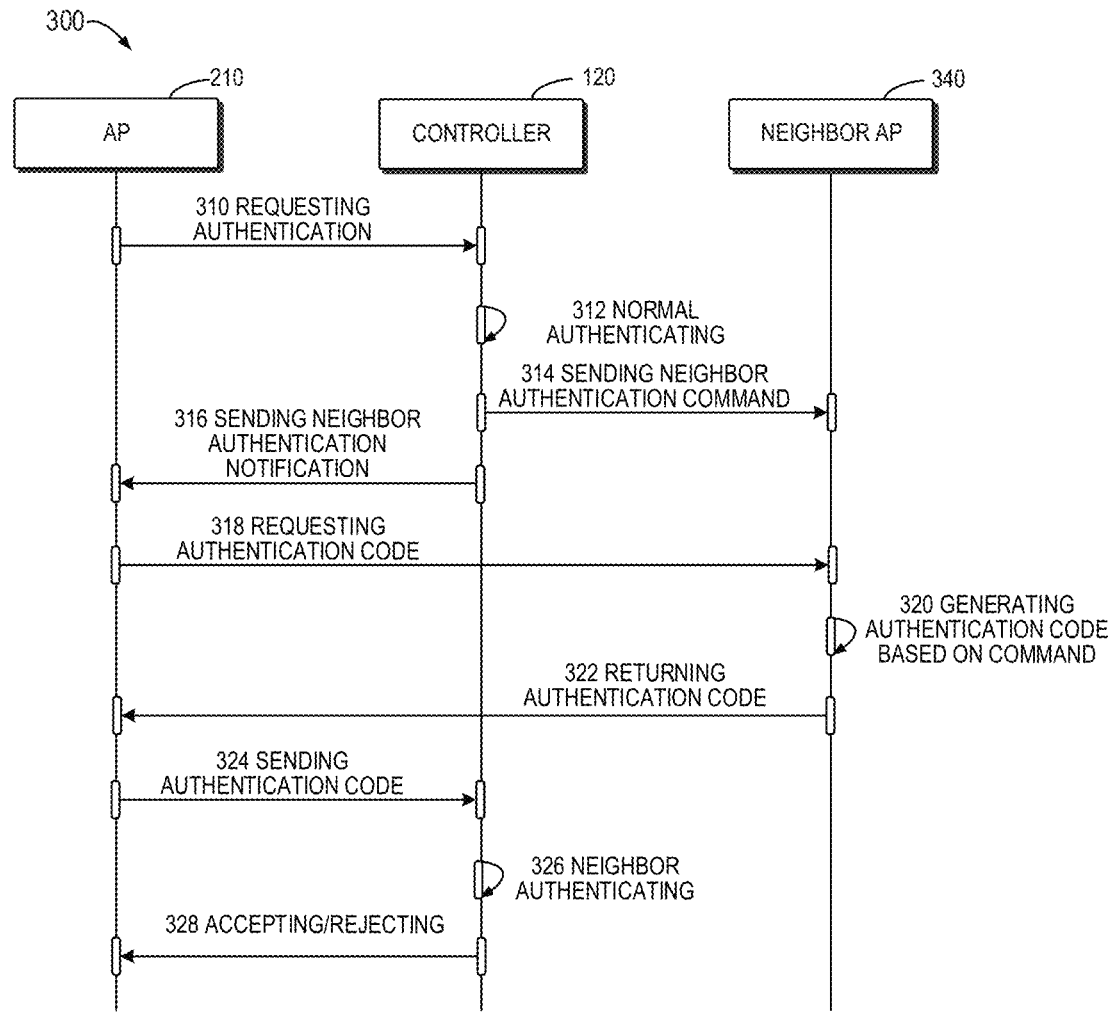
FIG. 3 illustrates a signaling chart of an example procedure for authenticating an AP to join a network based on a neighbor AP in the network according to embodiments of the present disclosure.

Hereinafter, reference will be made to FIG. 3 for more details about the authentication procedure among the AP 210, the controller 120 and a neighbor AP 340. FIG. 3 illustrates a signaling chart 300 of an example procedure for authenticating an AP to join a network based on a neighbor AP in the network according to embodiments of the present disclosure. In FIG. 3, the authentication procedure relates to three devices: the AP 210 that requests to join the network 110, the controller 120 of the network 110, and the neighbor AP 340 connected in the network 110.

The signaling chart 300 illustrates interactions among the AP 210, the controller 120 and the neighbor AP 340. Once the AP 210 is connected in the network 110, the AP 210 may request 310 the controller 120 for an authentication. Here, the requesting step may be implemented in a similar manner as normal. The controller 120 may authenticate 312 the AP 210 in a normal way. For example, the AP 210 may pass the normal authentication if the certification in the AP 210 is valid. Then, the neighbor authentication may start.

In some embodiments, the neighbor AP 340 may be a predefined AP that has already been connected in the network 110. Alternatively, the neighbor AP 340 may be selected by the controller 120 based on states of APs that are connected in the network 110. Specifically, the controller 120 may select the neighbor AP 340 based on scanning history and/or a deployment map of the network 110, such that a reliable and effective AP may be specified as the neighbor AP 340.

Figure 4:
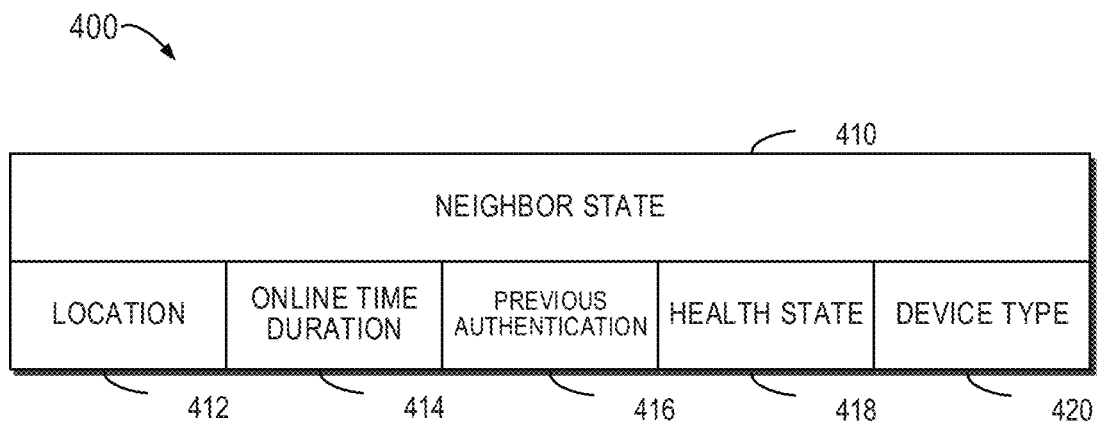
FIG. 4 illustrates a block diagram of an example data structure of a neighbor state according to embodiments of the present disclosure.

In some embodiments, the controller 120 may obtain states of a plurality of APs that are connected in the network 110. Reference will be made to FIG. 4 for details about the neighbor state, where FIG. 4 illustrates a block diagram of an example data structure 400 of a neighbor state according to embodiments of the present disclosure. In FIG. 4, the neighbor state may include a location 412 of the AP. Usually, the network 110 may cover a wide geography area, and locations of APs connected in the network 110 may be recorded in the network deployment map for network management. With the location 412 of the AP, the controller 120 may select an AP with a location near the AP 210 as the neighbor AP 340. Usually, the AP 210 is scheduled to be deployed at a predefined deploy location, and then an AP having the shortest distant from the predefined location may be selected as the neighbor AP. Alternatively, the neighbor AP 340 may be selected based on a distance between the real location of the AP 210 and the location 412. In this manner, the AP 210 and the neighbor AP 340 may communicate in an effective and easy way, for example, by the wireless communication.

In some embodiments, the neighbor state 410 may include an online time duration 414 of the AP. Here, the online time duration 414 refers to a time length since the AP has join in the network 110, and the time length may be reset to zero if the AP is offline. The online time durations of APs in the network 110 may be recorded in a data log of the network 110. Usually, the longer the online time duration 414 is, the more reliable the AP is. Therefore, the controller 120 may select an AP with a longer online time duration. Preferably, an AP having the longest online time duration may be selected as the neighbor AP 340. In this manner, it may be ensured that the neighbor AP 340 is reliable and trustable, and then the neighbor authentication may be implemented in a safe and reliable way.

In some embodiments, the neighbor state 410 may include the previous authentication 416 of the AP. Here, the previous authentication 416 refers to the authentication(s) that the AP has passed previously. For example, when the first AP joined the network 110 at an initial stage of the network 110, no neighbor AP exists in the network 110 and then the first AP may be authenticated by the normal authentication only. At this point, the previous authentication 416 may be set to "normal authentication." In another example, the second AP that requested to join the network 110 may be authenticated by both of the normal and neighbor authentications, and thus the previous authentication 416 for the second AP may be set to "normal and neighbor authentications."

Compared with the first AP that passed only the normal authentication, the second AP that passed both of the normal and neighbor authentications is more reliable and trustable. Therefore, the second AP may work as the neighbor AP to improve the security level of the neighbor authentication. In some embodiments, an AP with more previous authentications may be selected as the neighbor AR. In this manner, it may be ensured that the neighbor AP 340 is reliable and may be trusted, such that the neighbor authentication may be implemented in a safe and reliable way.

In some embodiments, the neighbor state 410 may include a health state 418 of the AP. Here, the health state 418 refers to an overall performance of the AP including any of a CPU workload, a memory workload, an available bandwidth, a response time, and the like. Usually, an AP with a better performance may quickly implement the neighbor authentication with less time delay, and then the controller 120 may select an AP with a better health state as the neighbor AP 340. In this manner, it may be ensured that the neighbor AP 340 is in quick response, and then the neighbor authentication may be implemented in an effective and fast way.

In some embodiments, a neighbor infrastructure device such as a router device or a switch device may be selected for generating the authentication code. Therefore, the neighbor state 410 may include a device type 420 of the AP. Here, the device type 420 refers to a type of the AP including: a router device, a switch device, a Wi-Fi hotspot device, and the like. Usually, the router device and the switch device are deployed via wired connections in a data center of the network 110, and thus the security level for these devices is higher. Therefore, an AP with the router or switch type may implement the neighbor authentication with a higher security and reliability level, and then the controller 120 may select these types of APs as the neighbor AP 340. In this manner, it may be ensured that the neighbor AP 340 itself is trustable, and then the neighbor authentication implemented by the trustable neighbor AP 340 is also reliable.

In some embodiments, the above aspects of the neighbor state 410 may be combined for selecting the neighbor AP 340. Specifically, weights may be assigned to aspects of the neighbor state 410, and then a score may be determined for each AP in the networks 110. Further, one or more neighbor APs may be selected from these APs for providing the neighbor authentication.

In some embodiments, an administrator of the network 110 may decide whether the neighbor authentication is enabled of not. For example, at the initial stage for building the network 110, no AP is connected in the network 110. When a new AP request to join the network 110, the new AP is usually deployed in the data center of the network 110 or another place with a high security level. At this point, the normal authentication procedure may provide sufficient protections and thus the neighbor authentication may be disabled. With the expansion of the network 110, more and more APs may be deployed at various locations with lower security levels, and then the neighbor authentication may be enabled for providing authentication enhancement.

As the AP 210 has pass the normal authentication, the AP 210 is considered to be trustworthy to a certain extent, and thus communication channels may be built among the AP 210, the controller 120 and the neighbor AP 340. Here, the communication channels may be based on a wired mode or a wired mode, and data may be transmitted on the communication channels in a secure way. For example, encryption operations may be implemented for the data communication.

The above paragraphs have described details for selecting the neighbor AP 340, hereinafter reference will be made back to FIG. 3 for further steps after the selection of neighbor AP 340. The controller 120 may send 314 a neighbor authentication command to the neighbor AP 340. Here, the neighbor authentication command may be send in a secure way to instruct the neighbor AP 340 to generate an authentication code. Hereinafter, reference will be made to FIG. 5 for more details about the neighbor authentication command, where FIG. 5 illustrates a block diagram of an example data structure 500 of a neighbor authentication command according to embodiments of the present disclosure.

Figure 5:
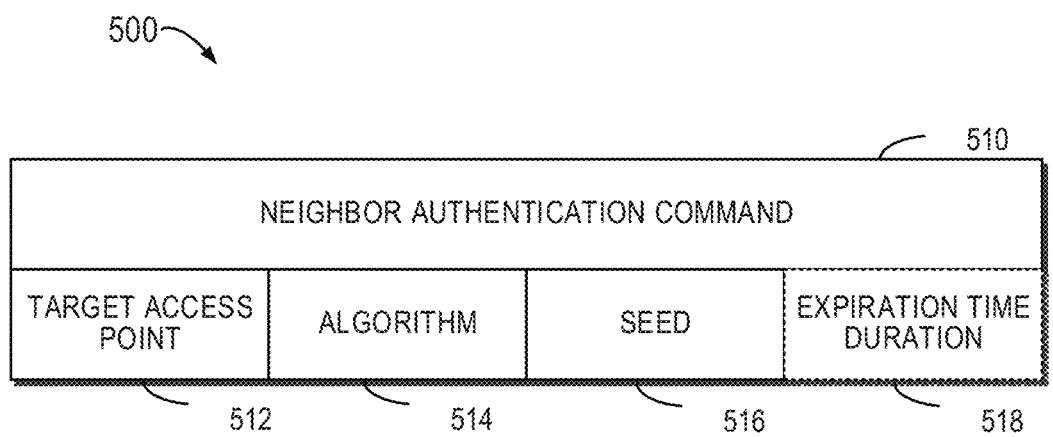
FIG. 5 illustrates a block diagram of an example data structure of a neighbor authentication command according to embodiments of the present disclosure.

In FIG. 5, the neighbor authentication command 510 may comprise a target AP 512 for which the authentication code is generated. In other words, the neighbor authentication command 510 may include an identification of the AP 210 and inform the neighbor 340 to generate an authentication code for the AP 210. With these embodiments, the neighbor AP 340 may generate the authentication code only for the AP 210 that has passed the normal authentication by the controller 120.

In some embodiments, the neighbor authentication command 510 may include an algorithm 514 based on which the authentication code may be generated. Here, the authentication code may be in a form of OTP (one time password), and thus the algorithm 514 may include various algorithms for generating a dynamic password. For example, the algorithm 514 may be implemented based on a symmetric encryption algorithm, a HMAC (Hash-based Message Authentication Code), and the like. Further, the neighbor authentication command 510 may include a seed 518 for generating the authentication code with the algorithm 514. With these embodiments, the neighbor AP 340 may generate the authentication code in a safe and effective way.

In some embodiments, the neighbor authentication command 510 may further comprise an expiration time duration for indicating a validity of the authentication code. For example, the expiration time duration may be set to one minute (or another value), once the expiration time duration is reached, the neighbor AP 340 may refresh the authentication code. With these embodiments, the OTP authentication code may enhance the security level of the neighbor authentication and then improve the overall security level of the network 110.

Although FIG. 3 illustrates that the controller 120 sends the neighbor authentication command for notifying the neighbor AP 340, this step may be omitted if the neighbor AP 340 is a predetermined AP for generating the authentication code. For example, the neighbor AP 340 is configured to directly generate the authentication code based on a predetermined algorithm and seed in response to a request from the AP 210.

Referring back to FIG. 3, the controller 120 may send 316 a neighbor authentication notification to the AP 210. Here, the neighbor authentication notification may instruct the AP 210 to obtain the authentication code from the neighbor AP 340. Although FIG. 3 illustrates that the controller 120 sends the neighbor authentication command and the neighbor authentication notification in a sequence manner, the controller 120 may implement the above sending steps in a different order or concurrently.

The AP 210 may request 318 the authentication code from the neighbor AP 340, and then the neighbor AP 340 may generate 320 the authentication code based on the algorithm 514 and the seed 516 in the neighbor authentication command 510. For example, the neighbor AP 340 may generate the authentication code based on the HMAC algorithm and the specified seed. Although FIG. 3 illustrates that the controller 120 receives the request from the AP 210 and then generates the authentication code in a sequence manner, the controller 120 may generate the authentication code before receiving the request or at the time point when receiving the request. Afterwards, the neighbor AP 340 may return 322 the authentication code to the AP 210.

The AP 210 may send 324 the received authentication code to the controller 120 for the neighbor authentication, and the controller 120 may implement 326 the neighbor authenticating to verify the authentication code received from the AP 210. Specifically, the controller 120 may generate a local authentication code based on the algorithm 514 and the seed 516 shared with the neighbor AP 340. Further, if the authentication code received from the AP 210 matches the local authentication code, the AP 210 may be accepted to join the network 110; otherwise the AP 210 may be rejected. Next, the controller 120 may accept/reject 328 the AP 210 based on the above result of the neighbor authentication.

In some embodiments, the authentication code may have a timestamp for indicating a time point when the authentication code is generated by the neighbor AP 340. If the timestamp is within the expiration time duration for the authentication code, the AP 210 may be accepted; otherwise the AP 210 may be rejected. In some embodiments, based on the expiration time duration, the neighbor AP 340 may periodically refresh the authentication code to a new version and then return the new version to the AP 210. Further, the AP 210 may send the new version and request the controller 120 to implement the authentication based on the new version.

The above paragraphs have provided details about the enhanced authentication by one neighbor AP. In some embodiments, the AP 210 may be authenticated by more than one neighbor AP 340. Specifically, the controller 120 may request the AP 210 to obtain authentication codes from more than one neighbor AP. At this point, the controller 120 may transmit to the AP 210 a further neighbor authentication notification for obtaining a further authentication code from a further neighbor AP (for example, the AP 130-3 in FIG. 1) that is different from the previous neighbor AP. The controller 120 may receive from the AP 210 the further authentication code generated by AP 130-3. If the authentication codes from all neighbor APs are valid, the AP 210 is allowed to join the network 220; otherwise, if any authentication code is invalid, the AP 210 is rejected.

The above embodiments may provide an enhanced authentication procedure and may detect abnormal situations of the AP. In one example, if an AP that has already connected in the network 110 is stolen by an attacker for analyzing at the attacker's office. The attacker may try to connect the AP back to the network 110 from the office. At this point, even if the AP is connected to the network 110, as the AP is far from its predefined deploy location, the AP cannot fetch the authentication code from the neighbor AP specified by the controller 120 according to the location. At this point, the AP cannot join the network 110 and thus the stolen AP may be detected.

In some embodiments, the neighbor selection is flexible and may be based on many factors such as a location, an online time duration, a previous authentication, a health state, and a device type of the plurality of APs in the network 110. If more APs are stolen, the neighborhood of the above stolen AP may change greatly. For example, the online time duration of the stolen APs may change and thus the stolen APs may be excluded from candidate neighbor APs. At this point, a fixed AP such as a switch or a router in the data center may be selected as the neighbor AP. In a special situation where only two APs are connected in the network 110 and both of them are stolen, the neighbor authentication procedure may be disabled until at least one reliable AP is connected in the network 110.

The above embodiments are especially useful for a network including a great number of APs. The number of AP may gradually grow as time goes, at the very beginning stage, the neighbor authentication may be disabled as there is no online AP in the network. During the expansion stage of the network, more APs may be powered on and request to join the network. At this point, the normal authentication procedures may be implemented for those APs, and the neighbor authentication procedures may be delayed until a reliable AP is specified as the neighbor AP.

With the above embodiments, the controller 120 may select one or more neighbor APs for generating authentication codes. Further, the controller 120 may verify validities of these authentication codes and decide whether to accept the AP requesting to join. Although the neighbor APs may be distributed in the network 110, the controller 120 may provide a centralized solution for managing the neighbor APs and achieving enhanced authentications, such that the network 110 may be managed in an effective and easy way.

The above embodiments may provide protections to the network 110 even if certifications in the APs are attacked. Some types of APs have TPM (Trusted Platform Module) storage for storing the certification, while some types of cheap APs do not have TPM storage and thus the certification is stored in the normal flash storage. At this point, the certification in the flash storage tends to be attacked. If the attacker copies the certification from an AP to a malicious AP for replacing the original one, then the malicious AP will pass the normal authentication because the copied certification is real and valid. With the embodiments, the malicious AP should go through another round of neighbor authentication. As the neighbor AP is instructed to generate the authentication code only for the predefined target AP, the malicious AP cannot pass the neighbor authentication and thus the network 110 may be protected from attacks from the malicious AP.

Further, the above embodiments may also provide enhanced protections to the IoT (Internet of Thins) network. Due to cost and power constrains, most of APs in IoT are not equipped with TPM storages. Therefore, the neighbor authentication procedure may protect the safety of the IoT by the authentication code. Specifically, the neighbor AP is instructed to generate authentication codes for certain APs, even if a malicious AP has a correct certification, it cannot pass the neighbor authentication. Accordingly, the security level of the IoT may be greatly increased by adjusting software configurations in a controller of the IoT and existing APs in the IoT, without a need to deploy new hardware in the IoT.

Figure 6:
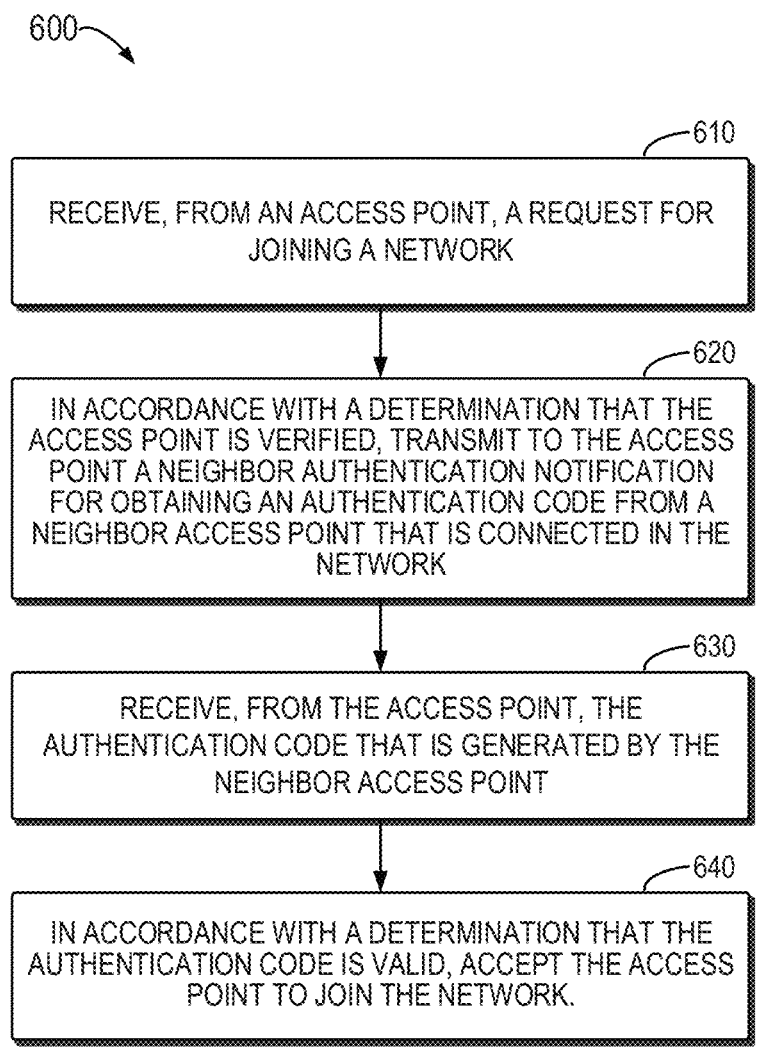
FIG. 6 illustrates a flowchart of an example method for authenticating an AP at a controller in a network according to embodiments of the present disclosure.

Having described communications between the AP 210, the controller 120 and the neighbor AP 340, hereinafter, reference will be made to FIG. 6 for steps implemented at the controller 120. FIG. 6 illustrates a flowchart of an example method 600 for authenticating an AP at a controller in a network according to embodiments of the present disclosure. In some embodiments, the method 600 is implemented at a controller 120 of the network 110, and the neighbor AP 340 comprises any of a router device, a switch device and a Wi-Fi hotspot device.

As illustrated in FIG. 6, at block 610, a request for joining a network is received from an AP. At block 620, in accordance with a determination that the AP is verified, a neighbor authentication notification is transmitted to the AP for instructing the AP to obtain an authentication code from a neighbor AP that is connected in the network. In some embodiments, the neighbor AP may be specified in advance. Alternatively and/or in addition to, the neighbor AP may be selected by the controller. Specifically, states of a plurality of APs that are connected in the network are obtained. Here, a state in the states comprises any of: a location, an online time duration, a previous authentication, a health state, and a device type for an AP in the plurality of APs. Then, the neighbor AP is selected based on the states of the plurality of APs.

In some embodiments, a neighbor authentication command is transmitted to the neighbor AP for generating the authentication code by the neighbor AP. In these embodiments, the neighbor authentication command comprises: a target AP for which the authentication code is generated, an algorithm with which the authentication code is generated, and a seed for generating the authentication code with the algorithm. In some embodiments, the neighbor authentication command further comprises: an expiration time duration for instructing the neighbor AP to refresh the authentication code.

At a block 630, the authentication code that is generated by the neighbor AP is received from the AP. Here, the authentication code may be verified to determine whether the AP is accepted to join the network. In some embodiments, at a block 640, the AP is accepted to join the network in accordance with a determination that the authentication code is valid. Specifically, a local authentication code is generated based on the algorithm and the seed, and then the authentication code is compared with the local authentication code. The AP is accepted to join the network in accordance with a determination that the authentication code matches the local authentication code. In some embodiments, the AP is rejected to join the network in accordance with a determination that the authentication code is invalid. In other words, if the authentication code does not match the local authentication code, then the AP is rejected.

In some embodiments, the authentication code has a timestamp, and the AP is accepted to join the network in accordance with a determination that a timestamp of the authentication code is within an expiration time duration for the authentication code. In some embodiments, the AP is rejected if the timestamp exceeds the expiration time duration. In some embodiments, the method 600 may be implemented for multiple times and more neighbor APs may be selected for further neighbor authentication procedures. In some embodiments, a further neighbor authentication notification is transmitted to the AP for obtaining a further authentication code from a further neighbor AP that is connected in the network. The further authentication code generated by the further neighbor AP is received from the AP. The AP is accepted to join the network in accordance with a determination that the further authentication code is valid.

With these embodiments, the method 600 provides an enhanced authentication solution. Besides the normal authentication by the controller 120, the controller 120 selects a neighbor AP 340 for generating an authentication code. The AP 210 may be further authenticated based the authentication code, therefore the security level of the network 110 may be increased.

Figure 7:
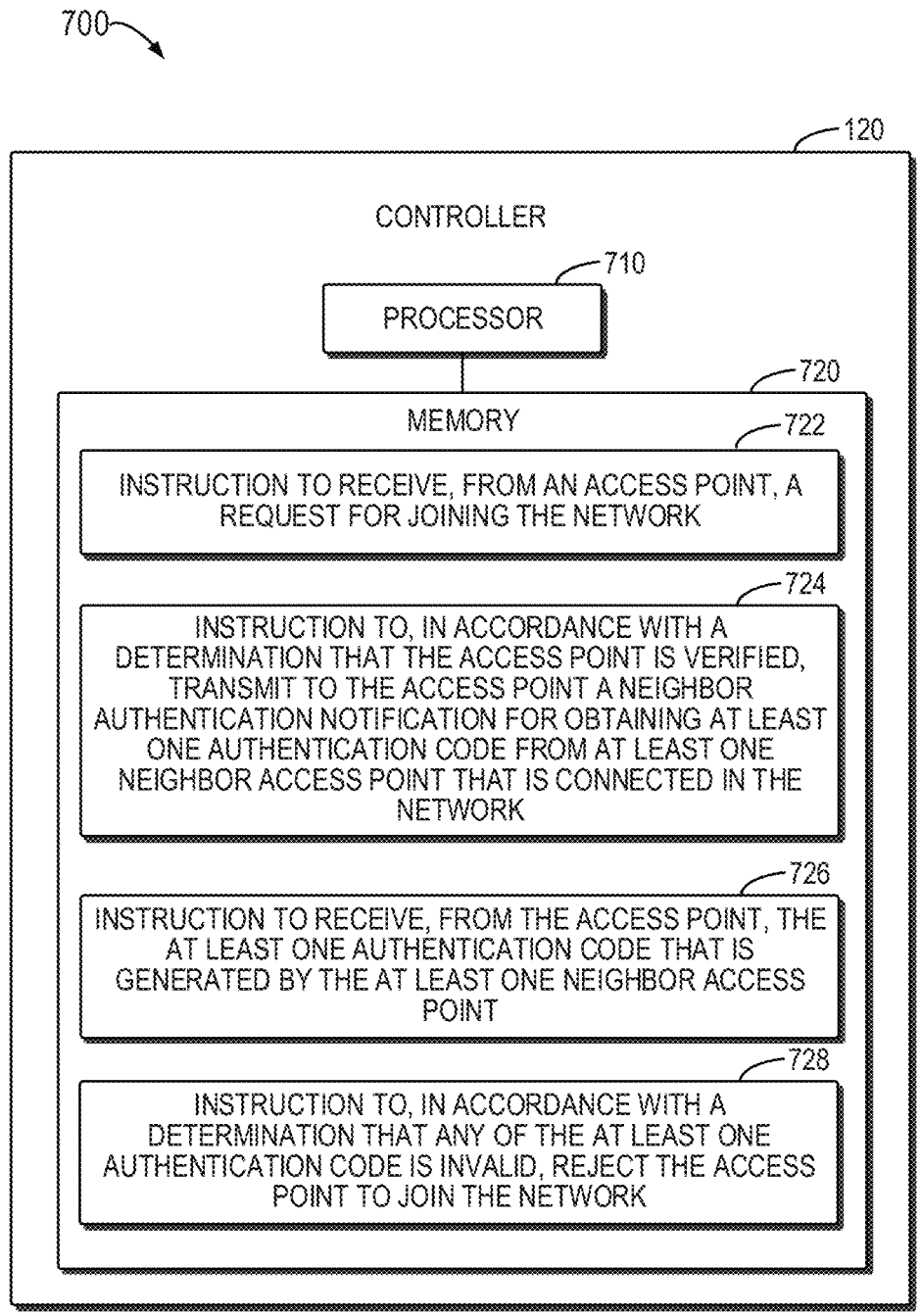
FIG. 7 illustrates a block diagram of an example controller in a network according to embodiments of the present disclosure.

FIG. 7 illustrates a block diagram 700 of an example controller in a network according to embodiments of the present disclosure. The controller 120 comprises a processor 710 and a memory 720 coupled to the processor 710. The memory 720 stores instructions 722, 724, 726, and 728 to cause the processor 710 to implement a method for authenticating an AP.

As illustrated in FIG. 7, the memory 720 stores the instruction 722 to receive, from an AP, a request for joining the network. The memory 720 further stores the instruction 724 to, in accordance with a determination that the AP is verified, transmit to the AP a neighbor authentication notification for obtaining at least one authentication code from at least one neighbor AP that is connected in the network. In some embodiments, the memory 720 further stores the instruction to obtain states of a plurality of APs that are connected in the network, a state in the states comprising any of: a location, an online time duration, a previous authentication, a health state, and a device type for an AP in the plurality of APs. In some embodiments, the memory 720 further stores the instruction to select the at least one neighbor AP based on the states of the plurality of APs.

In some embodiments, the memory 720 further stores instruction to transmit to the at least one neighbor AP at least one neighbor authentication command for generating the at least one authentication code at the at least one neighbor AP. Here, a neighbor authentication command in the at least one neighbor authentication command comprises a target AP for which an authentication code in the at least one authentication code is generated, an algorithm with which the authentication code is generated, and a seed for generating the authentication code.

In some embodiments, the memory 720 further stores the instruction 726 to receive, from the AP, the at least one authentication code that is generated by the at least one neighbor AP. The memory 720 further stores the instruction 728 to reject the AP to join the network in accordance with a determination that any of the at least one authentication code is invalid. In some embodiments, the memory 720 further stores the instruction to generate a local authentication code based on the algorithm and the seed comprised in the neighbor authentication command. In some embodiments, the memory 720 further stores the instruction to reject the AP to join the network in accordance with a determination that an authentication code associated with the neighbor authentication command does not match the local authentication code. In some embodiments, the memory 720 further stores the instruction to reject the AP to join the network in accordance with a determination that a timestamp of the authentication code exceeds an expiration time duration specified by the neighbor authentication command. In some embodiments, the memory 720 further stores the instruction to accept the AP to join the network in accordance with a determination that all of the at least one authentication code is valid.

With these embodiments, besides the controller 120, the neighbor AP 340 may works as a second authentication device in the network for providing a second authentication procedure. Based on the authentication code generated by the neighbor AP 340, the AP 210 needs to pass the neighbor authentication before joining the network 110, and thus the security level of the network 110 may be improved.

Figure 8:
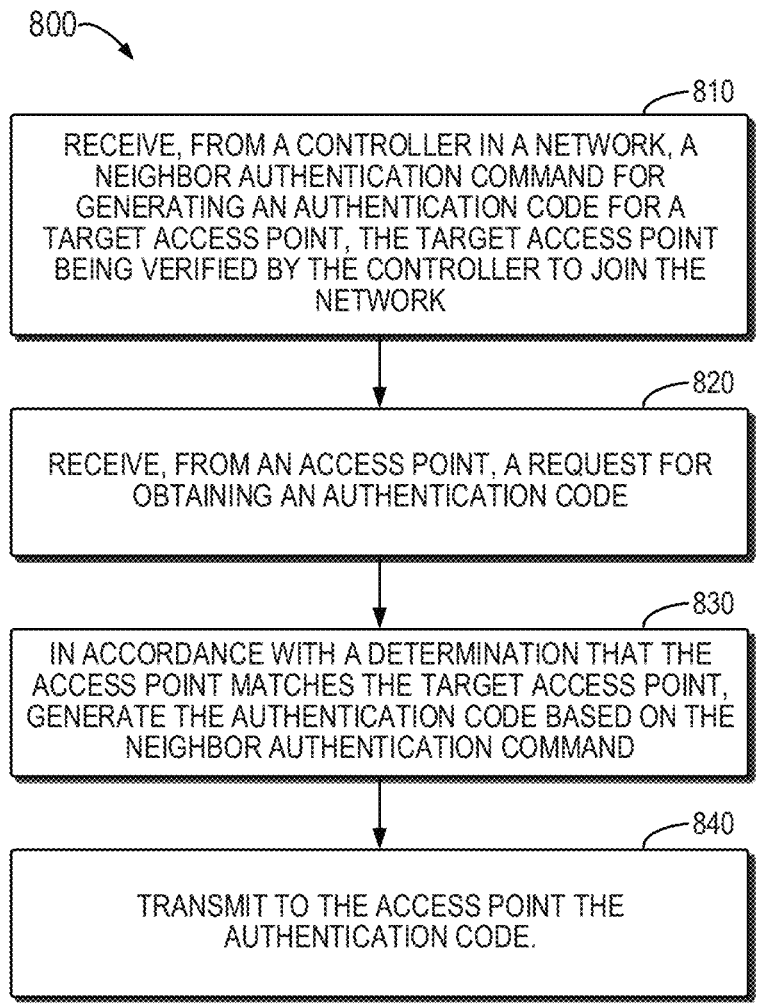
FIG. 8 illustrates a flowchart of an example method for authenticating an AP at a neighbor AP in a network according to embodiments of the present disclosure.

FIG. 8 illustrates a flowchart of an example method 800 for authenticating an AP at a neighbor AP in a network according to embodiments of the present disclosure. The method 800 may be implemented at a neighbor AP that is connected in the network. Here, the neighbor AP comprises any of a router device, a switch device and a Wi-Fi hotspot device. At a block 810, a neighbor authentication command is received from a controller in a network for generating an authentication code for a target AP, the target AP being verified by the controller to join the network. In some embodiments, the neighbor authentication command comprises an algorithm with which the authentication code is generated, and a seed for generating the authentication code with the algorithm. In some embodiments, generating the authentication code comprises: generating the authentication code based on the algorithm and the seed. In some embodiments, the neighbor authentication command further comprises an expiration time duration, and generating the authentication code further comprises: refreshing the authentication code based on the expiration time duration. At a block 820, a request is received from an AP for obtaining an authentication code. At a block 830, the authentication code is generated based on the neighbor authentication command. In some embodiments, a timestamp is added to the authentication code based on a time point when the authentication code is generated. At a block 840, the authentication code is transmitted to the AP in accordance with a determination that the AP matches the target AP.

With these embodiments, besides the normal authentication by the controller 120, the neighbor AP 340 may provide a second authentication procedure. Based on the authentication code generated by the neighbor AP 340, the AP 210 needs to pass the neighbor authentication before joining the network 110, and thus the security level of the network 110 may be improved.

Figure 9:
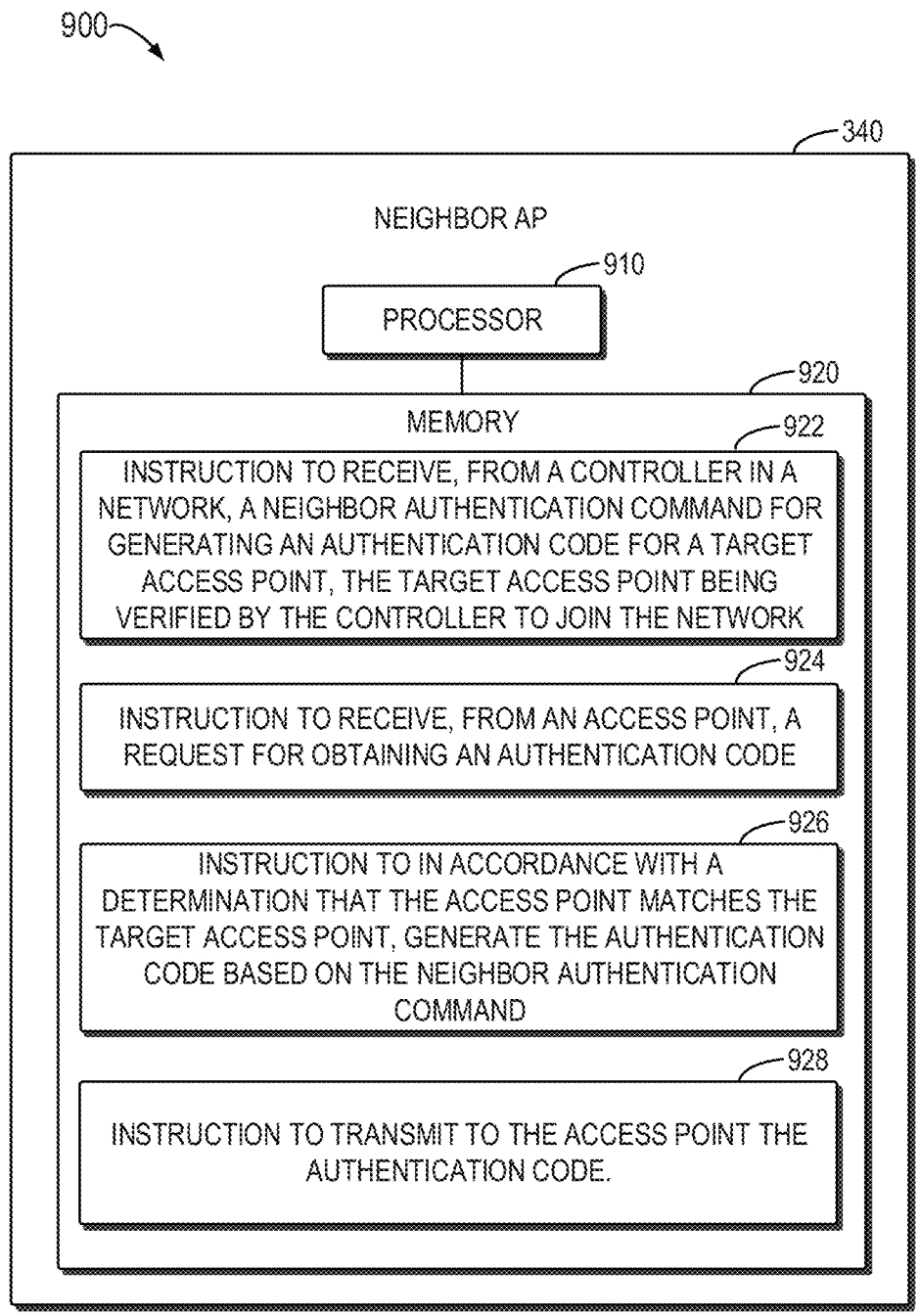
FIG. 9 illustrates a block diagram of an example neighbor AP according to embodiments of the present disclosure.

FIG. 9 illustrates a block diagram 900 of an example neighbor AP according to embodiments of the present disclosure. The controller 120 comprises a processor 910 and a memory 920 coupled to the processor 910. The memory 920 stores instructions 922, 924, 926, and 928 to cause the processor 910 to implement a method for authenticating an AP.

As illustrated in FIG. 9, the memory 920 stores the instruction 922 to receive, from a controller in a network, a neighbor authentication command for generating an authentication code for a target AP, the target AP being verified by the controller to join the network. In some embodiments, the memory 920 further stores the instruction 924 to receive, from an AP, a request for obtaining an authentication code. In some embodiments, the neighbor authentication command comprises an algorithm with which the authentication code is generated, and a seed for generating the authentication code with the algorithm, and generating the authentication code comprises: generating the authentication code based on the algorithm and the seed. In some embodiments, the memory 920 further stores the instruction 926 to generate the authentication code based on the neighbor authentication command in accordance with a determination that the AP matches the target AP. In some embodiments, the memory 920 further stores the instruction to add a timestamp to the authentication code based on a time point when the authentication code is generated. In some embodiments, the neighbor authentication command further comprises an expiration time duration. In some embodiments, the memory 920 further stores the instruction to generate the authentication code further comprises: refreshing the authentication code based on the expiration time duration. In some embodiments, the memory 920 further stores the instruction 928 to transmit to the AP the authentication code. With these embodiments, besides the controller 120, the neighbor AP may works as a second authentication device in the network 110, and the security level of the network may be improved.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate embodiments may also be implemented in combination in a single embodiment. Conversely, various features that are described in the context of a single embodiment may also be implemented in multiple embodiments separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A method, comprising:
receiving, by a controller from an access point, a request for the access point to join a network;
verifying, by the controller, the access point based on the request for the access point to join the network;
in response to verifying the access point,
transmitting, by the controller, a neighbor authentication notification to the access point for authenticating the access point by a neighbor access point, the neighbor authentication notification comprising instructions for obtaining an authentication code from the neighbor access point that is connected in the network; and
transmitting to the neighbor access point, by the controller, a neighbor authentication command for generating the authentication code by the neighbor access point, the neighbor authentication command comprising an identification of the access point for which the authentication code is generated, an algorithm with which the authentication code is generated, and a seed for generating the authentication code with the algorithm;
receiving, by the controller from the access point, the authentication code that is generated by the neighbor access point;
generating, by the controller, a local authentication code based on the algorithm and the seed; and
responsive to a determination, by the controller, that the authentication code is valid based on a comparison of the local authentication code with the authentication code, accepting the access point to join the network.

2. The method according to claim 1, wherein accepting the access point comprises:
in accordance with a determination that the authentication code matches the local authentication code, accepting the access point to join the network.

3. The method according to claim 1, wherein accepting the access point to join the network further comprises:
in accordance with a determination that a timestamp of the authentication code is within an expiration time duration for the authentication code, accepting the access point to join the network.

4. The method according to claim 3, wherein the neighbor authentication command further comprises: an expiration time duration for instructing the neighbor access point to refresh the authentication code.

5. The method according to claim 1, further comprising:
obtaining states of a plurality of access points that are connected in the network, a state in the states comprising any of: a location, an online time duration, a previous authentication, a health state, and a device type for an access point in the plurality of access points; and
selecting the neighbor access point based on the states of the plurality of access points.

6. The method according to claim 1, further comprising: in accordance with a determination that the authentication code is invalid, rejecting the access point to join the network.

7. The method according to claim 1, further comprising:
transmitting to the access point a further neighbor authentication notification for obtaining a further authentication code from a further neighbor access point that is connected in the network;
receiving, from the access point, the further authentication code that is generated by the further neighbor access point; and
in accordance with a determination that the further authentication code is valid, accepting the access point to join the network.

8. The method according to claim 1, wherein the method is implemented at a controller of the network, and the neighbor access point comprises any of a router device, a switch device and a Wi-Fi hotspot device.

9. A method, comprising:
receiving, by a neighbor access point from a controller in a network, a neighbor authentication command comprising instructions for generating an authentication code for a target access point, the neighbor authentication command comprising an identification of the target access point being verified by the controller to join the network, an algorithm with which the authentication code is generated, and a seed for generating the authentication code with the algorithm;
receiving, by the neighbor access point from an access point, a request for obtaining an authentication code;
in accordance with a determination that the access point matches the target access point identified in the neighbor authentication command, generating, by a neighbor access point, the authentication code based on the algorithm and the seed included in the neighbor authentication command; and
transmitting to the access point the authentication code, wherein the access point is accepted by the controller to join the network based on the authentication code.

10. The method according to claim 9, wherein generating the authentication code comprises: adding a timestamp to the authentication code based on a time point when the authentication code is generated.

11. The method according to claim 9, wherein the neighbor authentication command further comprises an expiration time duration, and generating the authentication code further comprises: refreshing the authentication code based on the expiration time duration.

12. The method according to claim 9, wherein the method is implemented at a neighbor access point that is connected in the network, and the neighbor access point comprises any of a router device, a switch device and a Wi-Fi hotspot device.

13. An authentication device in a network, comprising:
a processor; and
a memory coupled to the processor, the memory storing instructions to cause the processor to implement acts comprising:
receiving, from an access point, a request for the access point to join the network;
verifying the access point based on the request for the access point to join the network;
in response to verifying the access point,
transmitting to the access point a neighbor authentication notification for authenticating the access point by a neighbor access point, the neighbor authentication notification comprising instructions for obtaining at least one authentication code from at least one neighbor access point that is connected in the network; and
transmitting to the at least one neighbor access point at least one neighbor authentication command for generating the at least one authentication code by the at least one neighbor access point, the neighbor authentication command comprising an identification of the access point for which the authentication code is generated, an algorithm with which the authentication code is generated, and a seed for generating the authentication code with the algorithm;
receiving, from the access point, the at least one authentication code that is generated by the at least one neighbor access point;
generating, by the controller, a local authentication code based on the algorithm and the seed comprised in the neighbor authentication command; and
responsive to a determination that any of the at least one authentication code is invalid based on a comparison of the local authentication code with the at least one authentication code, rejecting the access point to join the network.

14. The authentication device according to claim 13, wherein rejecting the access point comprises:
in accordance with a determination that an authentication code associated with the neighbor authentication command does not match the local authentication code, rejecting the access point to join the network.

15. The authentication device according to claim 13, wherein rejecting the access point comprises:
in accordance with a determination that a timestamp of the authentication code exceeds an expiration time duration specified by the neighbor authentication command, rejecting the access point to join the network.

16. The authentication device according to claim 13, wherein the acts further comprise:
obtaining states of a plurality of access points that are connected in the network, a state in the states comprising any of: a location, an online time duration, a previous authentication, a health state, and a device type for an access point in the plurality of access points; and selecting the at least one neighbor access point based on the states of the plurality of access points.

17. The authentication device according to claim 13, wherein the acts further comprise: in accordance with a determination that the at least one authentication code is valid, accepting the access point to join the network.

* * * * *